US006856624B2

(12) United States Patent
Magret

(10) Patent No.: US 6,856,624 B2
(45) Date of Patent: Feb. 15, 2005

(54) TEMPORARY UNIQUE PRIVATE ADDRESS

(75) Inventor: Vincent Magret, Oak Park, CA (US)

(73) Assignee: Alcatel, Paris (FR)

( * ) Notice: Subject to any disclaimer, the term of this patent is extended or adjusted under 35 U.S.C. 154(b) by 856 days.

(21) Appl. No.: 09/790,051

(22) Filed: Feb. 21, 2001

(65) Prior Publication Data

US 2003/0219000 A1 Nov. 27, 2003

(51) Int. Cl.$^7$ .............................................. H04L 12/56

(52) U.S. Cl. ....................................... 370/392; 370/401

(58) Field of Search ................................ 370/352, 353, 370/354, 355, 331, 338, 389–392, 401–402, 433, 475; 709/201–205, 220, 227–228, 238–239, 245

(56) References Cited

U.S. PATENT DOCUMENTS

| | | | |
|---|---|---|---|
| 6,219,715 B1 | | 4/2001 | Ohno et al. |
| 6,496,704 B2 | * | 12/2002 | Yuan .......................... 455/466 |
| 6,501,746 B1 | * | 12/2002 | Leung ........................ 370/338 |
| 6,515,974 B1 | * | 2/2003 | Inoue et al. ................ 370/331 |
| 6,522,880 B1 | * | 2/2003 | Verma et al. ............... 455/436 |
| 6,535,493 B1 | * | 3/2003 | Lee et al. .................... 370/329 |
| 6,567,664 B1 | * | 5/2003 | Bergenwall et al. ........ 455/403 |
| 6,571,289 B1 | * | 5/2003 | Montenegro ................ 709/227 |
| 6,578,085 B1 | * | 6/2003 | Khalil et al. ................ 709/241 |
| 6,600,743 B1 | * | 7/2003 | Lee et al. .................... 370/390 |
| 6,614,774 B1 | * | 9/2003 | Wang .......................... 370/338 |
| 6,621,810 B1 | * | 9/2003 | Leung ........................ 370/338 |
| 6,760,444 B1 | * | 7/2004 | Leung ........................ 380/270 |
| 6,765,920 B1 | * | 7/2004 | Tari et al. .................... 370/401 |

OTHER PUBLICATIONS

Internet Papers: Margret,V; Choyi, V. Kumar; "Multicast Micro–Mobility Protocol (MMM) draft–magret–mobileip–mmm–00–txt"; Mobile IP working group; Internet Engineering Task Force; 22 pp. Jul. 1, 2000.

C. Perkins; IP Mobility Support for IPv4, revised; IETF Internet Draft; Feb. 2001; pp. i–99.

Ralph Droms; Automated Configuration of TCP/IP with DHCP; IEEE Internet Computing; Jul.–Aug. 1999; pp. 45–53.

Internet Papers: Egevang, K., Francis, P.; "The IP Network Address Translator (NAT)"; Network Working Group Request for Comments 1631; http://www.ietf.org/rfc/rfc1631.txt; May 1994; 9 pp.

(List continued on next page.)

*Primary Examiner*—Douglas W. Olms
*Assistant Examiner*—Van Nguyen
(74) *Attorney, Agent, or Firm*—Christie, Parker, Hale LLP; Jessica W. Smith; V. Lawrence Sewell

(57) ABSTRACT

A communication network providing mobile IP services to mobile nodes sharing the same private IP address. A mobile node visits a foreign network from its home network and transmits a registration request including its private IP address to a foreign agent on the foreign network. If the foreign agent determines that another mobile node with a valid registration shares the same private IP address, the foreign agent requests the mobile node to use a temporary address. The temporary address is sent along with the registration request to the registering mobile node's home agent. When the home agent receives a packet addressed to its mobile node, it creates two tunnels. An outer tunnel is created using a care-of address associated with the foreign agent. An inner tunnel is created using the temporary address assigned to mobile node. The packet is then forwarded via the two tunnels. Upon receipt of the tunneled packet by the foreign agent, it de-tunnels the outer tunnel to uncover the inner tunnel, and forwards the inner tunnel to the mobile node. The mobile node de-tunnels the inner tunnel to recover the original packet.

29 Claims, 11 Drawing Sheets

OTHER PUBLICATIONS

Internet Papers: Montenegro, G.; "Reverse Tunneling for Mobile IP"; Network Working Group Request for Comments 2344; http://www.ietf.org/rfc/rfc2344.txt; May 1998; 17 pp.

Internet Papers: Perkins, C.; "IP Encapsulation within IP; Oct. 1996"; Network Working Group Request for Comments 2003; http://www.ietf.org/rfc/rfc2003.txt; Oct. 1996; 13 pp.

Internet Papers: Perkins, C.; "IP Mobility Support"; Network Working Group Request for Comments 2002; http://www.ietf.org/rfc/rfc2002.txt; Oct. 1996; 69 pp.

Internet Papers: Perkins, C.; "Minimal Encapsulation within IP"; Network Working Group Request for Comments 2004; http://www.ietf.org/rfc/rfc2004.txt; Oct. 1996; 6 pp.

Internet Draft: Petr, Bernhard; "Private IP Encapsulation within IP (PIPE)"; Jan. 20, 2000; 18 pp.

Internet Papers: Rekhter, Y., Moskowitz, D., Karrenberg, G., de Groot, G.J., Lear, E.; "Address Allocation for Private Internets"; Network Working Group Request for Comments 1918; http://www.ietf.org/rfc/rfc1918.txt; Feb. 1996; 8 pp.

* cited by examiner

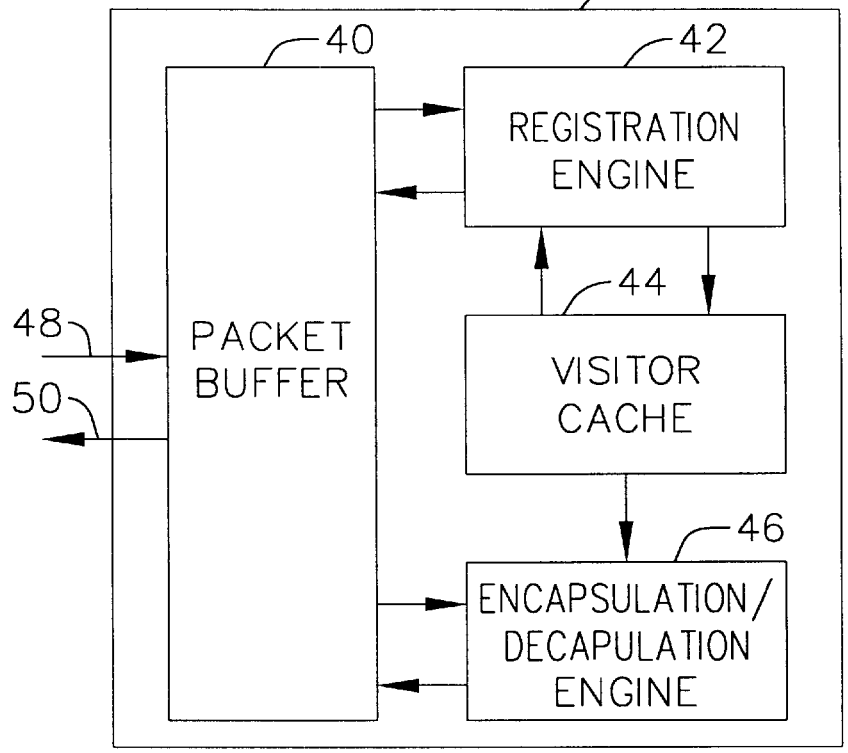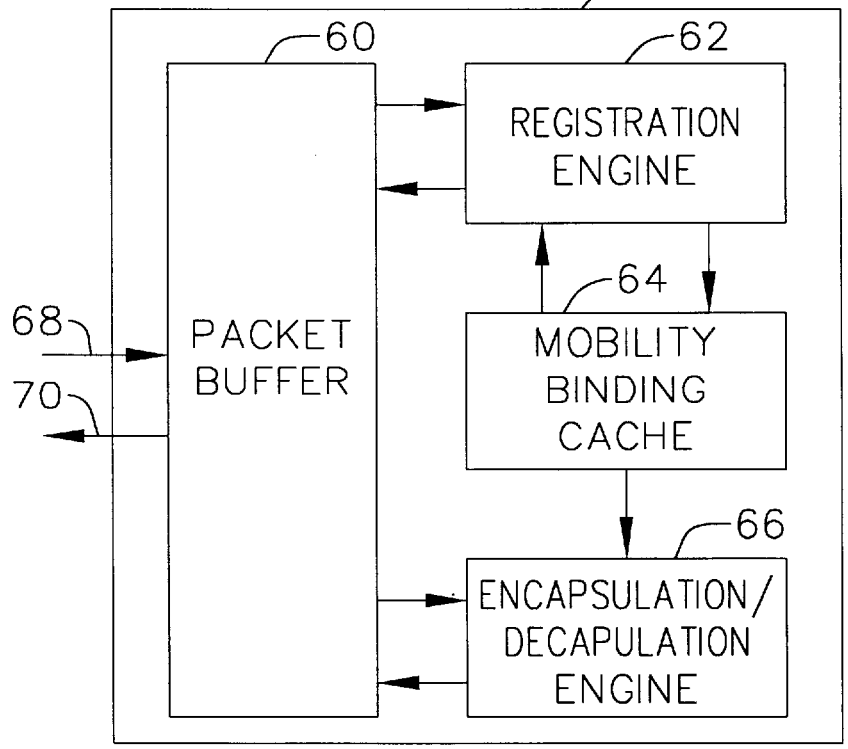

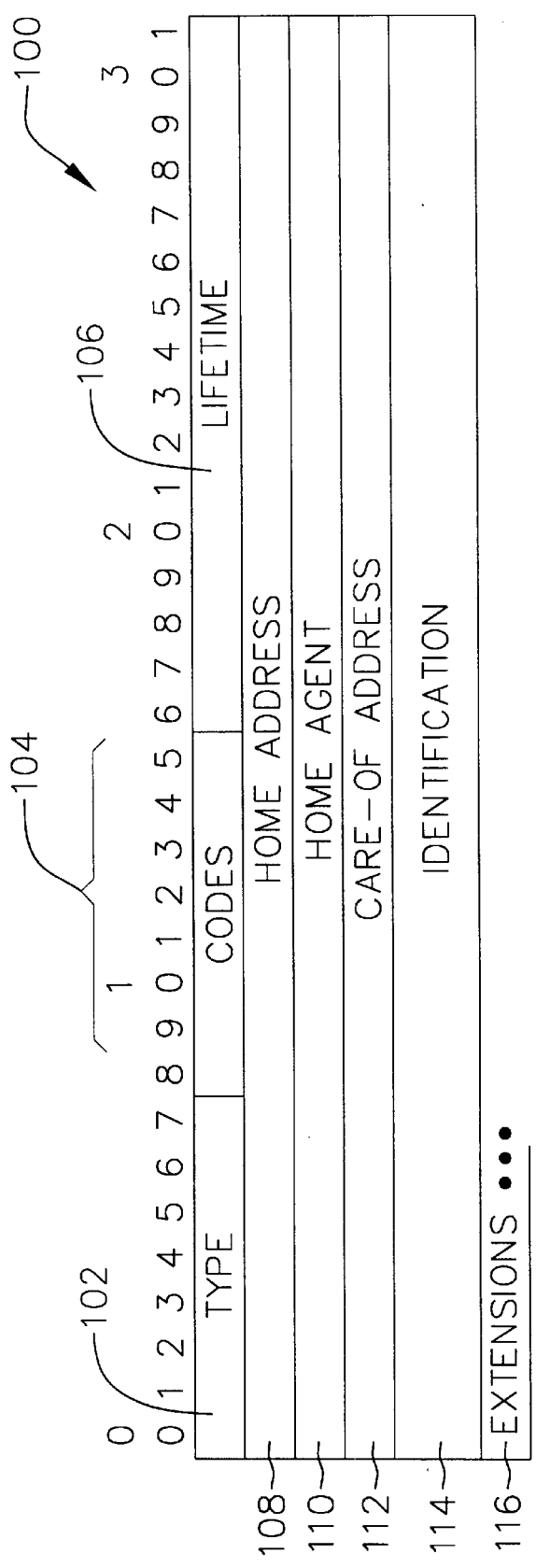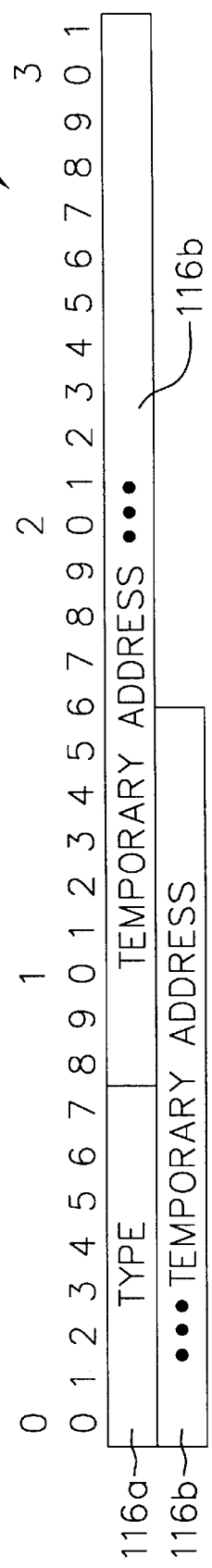

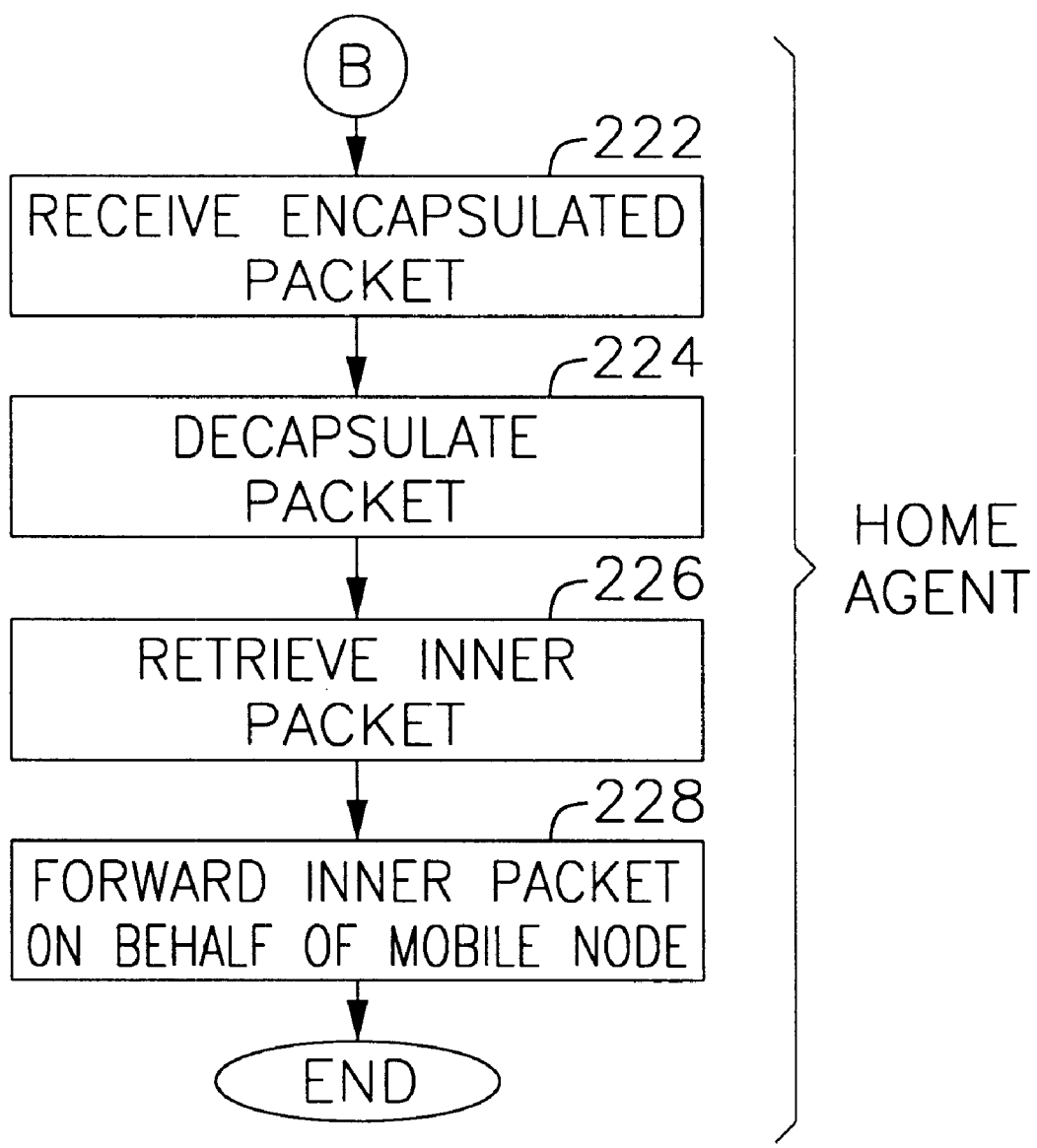

TEMPORARY UNIQUE PRIVATE ADDRESS

FIELD OF THE INVENTION

This invention relates generally to internet protocol (IP) addresses, and more particularly to providing IP routing services to mobile nodes sharing the same private IP address.

BACKGROUND OF THE INVENTION

The current internet protocol (IP) assigns a unique 32-bit address called an IP address to each node on the internet for enabling communication with the node. A node may be a network end-station, such as, for example, a computer, workstation, or server. The node may also be a gateway device, such as, for example, a switch or a router.

Due to the booming evolution of the internet, IP addresses have become a scarce resource. In 1996, the Internet Engineering Task Force (IETF) published a Best Common Practice describing a range of IP addresses reserved for use with private networks, described in further detail in "Address Allocation for Private Internets," Y. Rekhter et al., IETF Request for Comment (RFC) 1918, February 1996 (hereinafter referred to as RFC 1918), the content of which is incorporated herein by reference. These addresses, known as private or nonroutable addresses, help provide a temporary solution to the depletion of globally unique IP addresses. Private IP addresses, however, are not guaranteed to be unique because they may be used by multiple nodes in different private networks. Therefore, private IP addresses are not routable over the internet.

A node having a private IP address desiring to communicate over the internet may nonetheless do so using a technology known as network address translation (NAT), described in further detail in "The IP Network Address Translator (NAT)," K. Egevang et al., RFC 1631, May 1994, the content of which is incorporated herein by reference. NAT requires a site to have a single connection to the global internet and at least one globally valid IF address. NAT translates the addresses in both outgoing and incoming data units by replacing the source address in each outgoing data unit with the globally valid IP address, and replacing the destination address in each incoming data unit with the private IP address of the correct node.

Although a private IP address assigned to a node is unique in its home site, duplicate private IP addresses may be encountered if the node is a mobile node that moves to a foreign site and remains temporarily attached there. If the private IP address is assigned to the mobile node at the home site for an extended period of time, the private IP address is referred to as the mobile node's home address. A home site may be a network or a group of networks having a network address whose prefix matches that of the mobile node's home address. A foreign network may be any network other than the mobile node's home network.

Under the existing protocol for IP routing for mobile nodes (hereinafter referred to as "mobile IP"), described in detail in "IP Mobility Support," C. Perkins (Editor) RFC 2002, October 1996 (hereinafter referred to as RFC 2002), the content of which is incorporated herein by reference, a mobile node may move from network to network, changing its point of attachment to the internet, while continuing to be reachable through its home address. Thus, a mobile node whose home address is a private IP address maintains and uses the private IP address while visiting the foreign site. Consequently, duplicate private IP addresses may be encountered if two mobile nodes belonging to two different networks but configured with the same private IP address as their home addresses visit the same foreign site. In this case, the exact identity of the mobile node transmitting and receiving a packet becomes unclear.

According to the mobile IP protocol, a mobile node acquires a care-of address generally via a foreign agent advertisement message. A foreign agent may be a gateway device, such as, for example, a switch or a router, providing mobile IP services to the mobile node from the foreign site. The care-of address may be a foreign agent care-of address or a co-located care-of address. The foreign agent care-of address is generally the IP address of the foreign agent. The co-located care-of address is a local IP address on the foreign network assigned to the mobile node.

Once the mobile node has acquired a care-of address, it registers this address with its home agent. The home agent may be a gateway device, such as, for example, a switch or a router, providing mobile IP services to the mobile node from the home site. The home agent intercepts packets addressed to the mobile node and tunnels the packets to the care-of address at the foreign site. When the care-of address is a foreign agent care-of address, the foreign agent decapsulates and delivers the packet to the mobile node to which the packet is addressed. However, if two mobile nodes share the same private address, an ambiguity arises as to the exact recipient of the packet.

In transmitting a packet from the foreign site, the mobile IP protocol provides that the packet is to be transmitted by the mobile node via a standard IP routing protocol. However, when the mobile node is configured with a private IP address, the standard IP routing protocol is inadequate for transmitting the packet. Instead, the private address must first be translated to a globally unique IP address using NAT, and then routed over the internet.

Reverse tunneling, described in further detail in "Reverse Tunneling for Mobile IP," G. Montenegro (editor), RFC 2344, May 1998 (hereinafter referred to as RFC 2344), the content of which is incorporated herein by reference, may provide a potential solution to the problem of using private IP addresses for transmitting packets from a foreign site. Reverse tunneling allows packets to be transmitted by the home agent on behalf of its mobile node.

In a direct delivery style of reverse tunneling, the mobile node designates the foreign agent as its default router and proceeds to send packets directly to the foreign agent, that is, without encapsulation. The foreign agent intercepts the packet and tunnels them to the home agent. The home agent may then invoke NAT to translate the private IP address and transmit the packets on behalf of its mobile node.

In an encapsulating delivery style, the mobile node encapsulates all its outgoing packets to the foreign agent. The foreign agent decapsulates and re-tunnels them to the home agent, using the foreign agent's care-of address as the entry-point of the new tunnel. The home agent may again involve NAT to translate the private IP address and transmit the packets on behalf of its mobile node.

Although reverse tunneling may be applied to allow the use of private IP addresses in transmitting packets from a foreign site, it does not extend to the situation where duplicate IP addresses are used in the same foreign site. Where such duplicate IP addresses exist, an ambiguity arises as to the home agent to which a packet is to be reverse tunneled.

One potential solution for the problem of duplicate IP addresses is the use of co-located care-of addresses instead of a foreign agent care-of address. A co-located care-of address is acquired by the mobile node as a local IP address on the foreign network either on a temporary or long-term basis, as is described in further detail in RFC 2002. When using a co-located care-of address, it is the mobile node and not the foreign agent that receives packets tunneled by its home agent. Since each mobile node is assigned to a different care-of address, the packets are tunneled to the appropriate mobile node. This solution, however, places unnecessary demands on the already limited IP address space, and is therefore undesireable.

Another potential solution to the problem of duplicate private IP addresses in foreign sites is private IP encapsulation within IP, discussed in further detail in a working draft entitled "Private IP Encapsulation within IP (PIPE)," B. Petri, January 2000, which is an extension of "IP Encapsulation within IP," C. Perkins, RFC 2003, October 1996, the contents of both of which are incorporated herein by reference. Private IP encapsulation within IP uses a virtual private network (VPN) identifier to identify the private network to which a private IP address belongs. The VPN identifier may be attached to the private IP address to create a globally unique address that is routable over the Internet. The VPN identifier is embedded between the outer and inner IP headers of an IP packet.

Although PIPE may allow duplicate private IP addresses for mobile nodes in the foreign site, it requires that all mobile nodes with the same private IP address receive and examine an incoming packet to determine if they are the correct destination since the VPN identifier is embedded between the tunnel. This creates an extra overhead taking up air interface and/or the mobile node's battery life, both of which are considered to be scarce resources. It also severely reduces the privacy of the communication in which the mobile node is involved.

Accordingly, there is a need in the art for a system and method for efficiently resolving the ambiguity created by the use of duplicate private IP addresses in a foreign site. Such a system and method should resolve the ambiguity without placing a burden on scarce resources, whether it be IP addresses, air interface, or battery life.

SUMMARY OF THE INVENTION

The present invention is directed to a system and method for providing mobile IP services to mobile nodes that share the same private IP address as their home addresses. In one embodiment of the invention, a data communication network includes a first forwarding node associated with a first site, a second forwarding node associated with a second site, and a first mobile node with a first address visiting the second site from the first site. The second forwarding node determines whether a second mobile node visiting the second site has the same first address as the first mobile node. If the second mobile node has the same first address, the second forwarding node selects a second address for the first mobile node to resolve the ambiguity. The second forwarding node then transmits the second address to the first forwarding node to be used to forward packets addressed to the first mobile node.

In another embodiment of the invention, the second forwarding node includes an input for receiving an inbound packet, an output for forwarding an outbound packet, a memory for storing a second address of a second mobile node visiting the second site, and a registration engine coupled to the input, output, and memory. The registration engine receives a registration request packet including the first address via the input, and searches the memory for determining whether the first address is the same as the stored second address. If the first address is the same as the second address, the registration engine selects a third address for the first mobile node and transmits the third address via the output.

In another embodiment of the invention, the first forwarding node includes an input for receiving an inbound packet, an output for forwarding an outbound packet, a memory associating the mobile node to a particular address, and an encapsulation engine coupled to the input, output, and memory. A first packet addressed to the mobile node is received by the input and encapsulated by the encapsulation engine into a second packet having the particular address as a destination address. The second packet is further encapsulated into a third packet and transmitted to the second forwarding node via the output.

In a further embodiment of the invention, the mobile node includes an input for receiving an inbound packet, an output for transmitting an outbound packet, and a registration engine coupled to the input and the output. The registration engine transmits a first registration request packet including the first address via the output, receives a registration reply packet including a second address via the input, and transmits a second registration request packet including the second address via the output.

DESCRIPTION OF THE DRAWINGS

These and other features, aspects and advantages of the present invention will be more fully understood when considered with respect to the following detailed description, appended claims, and accompanying drawings where:

FIG. 2 is a block diagram of a foreign agent according to one embodiment of the invention;

FIG. 3 is a block diagram of a home agent according to one embodiment of the invention;

FIG. 5 illustrates a registration packet according to one embodiment of the present invention;

FIG. 6 illustrates an extension field used for transmitting a temporary address according to one embodiment of the present invention;

FIGS. 11A–11C are flow diagrams illustrating the transmission of an outgoing packet by the mobile node of FIG. 4 upon being assigned a temporary address according to one embodiment of the current invention.

DESCRIPTION OF THE INVENTION

Figure 1:
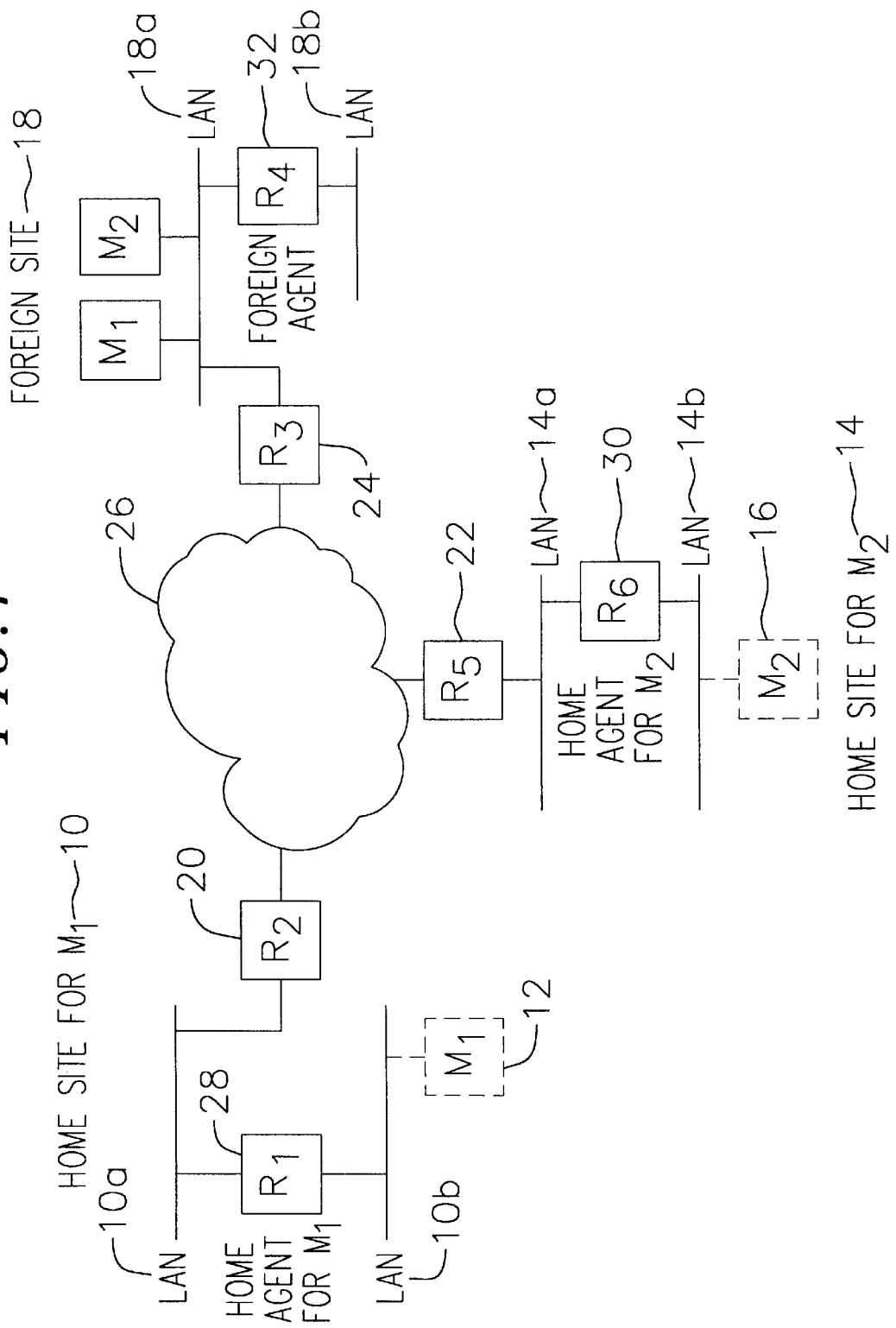
FIG. 1 is a semi-schematic block diagram illustrating a network environment supporting private IP addressing for mobile

FIG. 1 is a semi-schematic block diagram illustrating a network environment supporting private IP addressing for mobile IP. The network includes a home site 10, home site 14, and foreign site 18, coupled respectively to a backbone network 26 over switching nodes 20, 22, and 24.

Home site 10 includes a home agent 28 coupled to local area networks 10a, 10b. Similarly, home site 14 includes a home agent 30 coupled to local area networks 14a, 14b. Foreign site 18 includes a foreign agent 32 coupled to local area networks 18a, 18b.

Home sites 10 and 14 are respectively the home sites for mobile nodes 12 and 16. In an exemplary embodiment, mobile nodes 12 and 16 move from their respective home sites 10 and 14 to the foreign site 18, and remain temporarily connected to the foreign site.

Home and foreign agents 28, 30 and 32 may be gateway devices, such as, for example, switches, routers, and/or the like, including network interfaces for forwarding packetized communications. Home agents 28, 30 preferably support the functions of mobile IP at the home site 10 by tunneling to the foreign agent 32 data packets addressed to the mobile nodes 12, 16 when the mobile nodes are away from home. Home agents 28, 30 further receive a reverse tunneled packet from the foreign agent 32, and uses NAT to convert the private IP address of the transmitting mobile node, as indicated in a source address field of the packet, into a global IP address. The home agent then transmits the packet on behalf of the mobile node.

The foreign agent 32 preferably supports the functions of mobile IP at the foreign site by receiving the tunneled packets from the home agents 28, 30, and forwarding them to the appropriate mobile node 12, 16. In addition, the foreign agent 32 provides forwarding services to the mobile nodes 12, 16 by transmitting outgoing packets to their respective home agents 28, 30 via reverse tunneling.

Mobile nodes 12, 16 are preferably hosts, such as portable computers, workstations, servers, or other network end-stations capable of changing their points of attachment from one network or subnetwork to another. In an alternative embodiment, mobile nodes 12, 16 are gateway devices, such as switches, routers, and the like, also capable of changing their points of attachment from one network or subnetwork to another. Mobile nodes 12, 16 preferably share the same private IP address as their home addresses, allocated according to the procedures set forth in RFC 1918. Preferably, the private IP address is selected from a private address space whose prefixes include 10/8, 172.16/12, 192.168/16, or 169.254/16.

The home agents 28, 30, foreign agents 32, and mobile nodes 12, 16, may be interconnected via cables or other transmission media, and may support various data communication protocols, such as, for example, Ethernet, IP, ATM (Asynchronous Transfer Mode), or other protocols conventional in the art.

Although the network illustrated in FIG. 1 illustrates only one home agent or foreign agent per site, a person skilled in the art should recognize that the network may conventionally support multiple home agents and/or foreign agents. A person skilled in the art should also recognize that the foreign network may conventionally support multiple mobile nodes with the same private IP address, and is not limited to only two.

In general terms, mobile node 16 arrives at the foreign site 18 and seeks to register with its home agent 30 to communicate its current reachability information. Accordingly, mobile node 16 transmits a registration request including its private IP address to the foreign agent 32. The foreign agent 32 receives the registration request and determines whether another mobile node with an unexpired or pending registration shares the same private IP address as mobile node 16. It is assumed for this example that that mobile node 12 is registered at the foreign site or has a pending registration, and shares the same private IP address as mobile node 16 as its home address. The foreign agent 32 thus sends a registration reply, requesting mobile node 16 to use a temporary address. This temporary address is sent along with the registration request to its home agent 30.

When home agent 30 receives a packet addressed to mobile node 16, it preferably creates two tunnels to forward the packet to the node. An outer tunnel is created using a care-of address associated with the foreign agent 32. An inner tunnel is created using the temporary address assigned to mobile node 16. The packet is then transmitted via the two tunnels. When the foreign agent 32 receives the tunneled packet, it de-tunnels the outer tunnel to uncover the inner tunnel, and forwards the inner tunnel to mobile node 16. Mobile node 16 then de-tunnels the inner tunnel to retrieve the original packet.

When mobile node 16 seeks to transmit an outgoing packet from the foreign site 18, it transmits the packet to the foreign agent 32 preferably using the encapsulating delivery style set forth in RFC 2344. The outer tunnel preferably includes the temporary address as its source address, and the foreign agent care-of address as its destination address. Upon receipt of the encapsulated packet, the foreign agent 32 locates the appropriate home agent associated with the temporary address, and transmits the inner outgoing packet to the home agent in a reverse tunnel.

FIG. 2 is a more detailed block diagram of the foreign agent 32 according to one embodiment of the invention. The foreign agent 32 preferably includes a packet buffer 40, a registration engine 42, a visitor cache 44, and an encapsulation/decapsulation engine 46. The registration and encapsulation/decapsulation engines 40, 46 are preferably software modules. Alternatively, implementation of the system may be accomplished in combination of hardware, firmware (such as, for example, application specific integrated circuits or other customized circuits), and/or software, or by any method known in the art.

The foreign agent 32 preferably receives inbound packets via an ingress port 48. The packets may include, but are not limited to, Ethernet frames, ATM cells, TCP/IP and/or UDP/IP packets, and may also include other Layer 2 (Data Link/MAC Layer), Layer 3 (Network Layer) or Layer 4 (Transport Layer) data units. One particular type of packet received by the foreign agent 32 is a registration request packet transmitted by the mobile nodes 12, 16 for registering themselves with their respective home agents 28, 30. Another type of packet received by the foreign agent 32 is an encapsulated packet transmitted by the home agents 28, 30 for forwarding to the mobile nodes 12, 16. And yet another type of packet is an encapsulated packet transmitted by the mobile nodes 12, 16 for reverse tunneling to their respective home agents 28, 30.

When packets are received, they are preferably stored in the packet buffer 40. The packet buffer 40 may include a packet FIFO for receiving and temporarily storing the packets. The packet buffer 40 preferably provides the stored packets or portions thereof to the registration engine 42 and/or encapsulation/decapsulation engine 46 for processing.

The registration engine 42 receives all or portions of a registration request packet and queries the visitor cache 44 to determine whether the mobile node seeking to register has the same private IP address as another mobile node with a valid registration at the foreign site 18. The visitor cache may include any memory or storage device known in the art. For each mobile node registered or pending to be registered, the visitor cache 44 preferably includes the mobile node's link-layer source address, home address, temporary address (if assigned), home agent address, lifetime information, and the like.

If an entry for the private IP address already exists in the visitor cache, the registration engine 42 transmits via an egress port 50 a registration reply packet including a temporary address indicating that the temporary address should be used by the mobile node to resolve the ambiguity. However, if the visitor cache 44 does not contain the same private IP address, the registration engine 42 forwards the registration request to the appropriate home agent proceed with the standard registration process as set forth in RFC 2002.

The encapsulation/decapsulation engine 46 receives encapsulated packets transmitted by a home agent and decapsulates them for transmitting to the appropriate mobile node. In addition, the encapsulation/decapsulation engine receives an encapsulated packet transmitted by a mobile node, decapsulates the received packet, identifies the mobile node's home agent, and encapsulates it for reverse tunneling to the identified home agent.

FIG. 3 is a more detailed block diagram of home agents 28, 30 according to one embodiment of the invention. Each home agent preferably includes a packet buffer 60, a registration engine 62, a mobility bindings cache 64, and an encapsulation/decapsulation engine 60. The registration and encapsulation/decapsulation engines 62, 66 are preferably software modules. Alternatively, implementation of the system may be accomplished in combination of hardware, firmware (such as, for example, application specific integrated circuits or other customized circuits), and/or software, or by any method known in the art.

The home agent preferably receives inbound packets via an ingress port 68. The packets may include, but are not limited to, Ethernet frames, ATM cells, TCP/IP and/or UDP/IP packets, and may also include other Layer 2 (Data Link/MAC Layer), Layer 3 (Network Layer) or Layer 4 (Transport Layer) data units. One particular type of packet received by the home agent is a registration request packet forwarded by the foreign agent 32. Another type of packet is an encapsulated packet also transmitted by the foreign agent 32 during reverse tunneling.

When the packets are received, they are preferably stored in the packet buffer 60. The packet buffer 60 may include a packet FIFO for receiving and temporarily storing the packets. The packet buffer 60 preferably provides the stored packets or portions thereof to the registration engine 62 and/or the encapsulation/decapsulation engine 66 for processing.

The registration engine 60 receives all or portions of a registration packet and either accepts or denies the registration request. If the registration request is accepted, the registration engine 60 creates or updates the mobility binding information in the mobility bindings cache 64 for the registering mobile node. The mobility bindings cache 64 may include any memory or storage device known in the art. If a temporary address has been assigned to the mobile node, the mobility binding information is preferably the association of the mobile node's private IP address to the foreign agent care-of address and temporary address, along with the remaining lifetime of the association. The registration engine 62 then transmits a registration reply packet to the packet buffer, which transmits it to the foreign agent 32 via an egress port 70.

The encapsulation/decapsulation engine 66 receives encapsulated packets transmitted by the foreign agent 32 and decapsulates them for transmitting to the appropriate destination address on behalf of its mobile node. In addition, the encapsulation/decapsulation engine receives a packet addressed its mobile node and encapsulates it for tunneling to the foreign agent 32.

Figure 4:
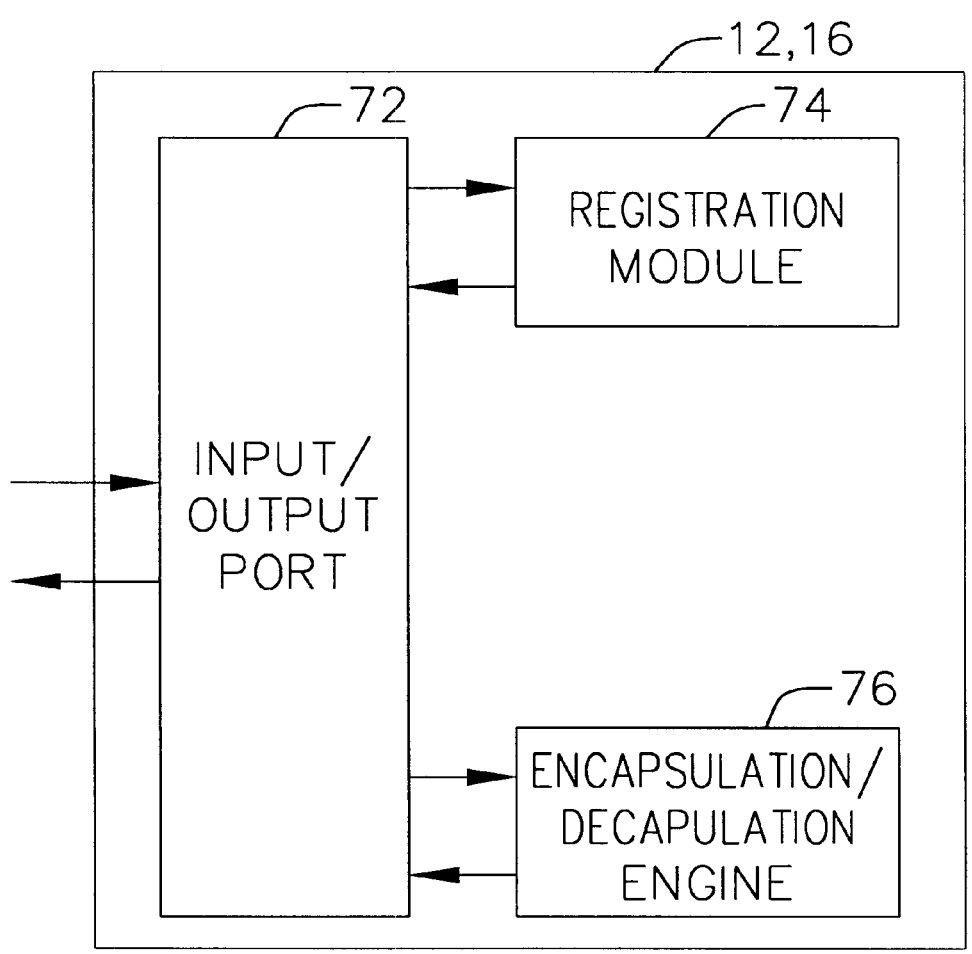
FIG. 4 is a block diagram of a mobile node according to one embodiment of the invention.

FIG. 4 is a more detailed block diagram of mobile nodes 12, 16 according to one embodiment of the invention. Each mobile node preferably includes an input/output port 72, registration module 74, and encapsulation/decapsulation module 76. The registration and encapsulation/decapsulation modules are preferably software modules. Alternatively, implementation of the system may be accomplished in combination of hardware, firmware (such as, for example, application specific integrated circuits or other customized circuits), and/or software, or by any method known in the art.

The registration module 74 preferably creates a registration request packet including the mobile node's private IP address, and transmits the packet to the foreign agent 32 via the input/output port 72. The registration module 74 further receives a registration reply packet from the foreign agent 32 indicating that the request has been accepted or denied. If the registration request has been denied and the registration reply packet includes a temporary address, the registration module 74 preferably transmits another registration request including the temporary address.

The encapsulation/decapsulation engine 76 receives encapsulated packets transmitted by the foreign agent 32, and decapsulates them for retrieving the inner packet. The encapsulation/decapsualtion engine 76 also encapsulates outgoing packets and transmits them to the foreign agent 32 for reverse tunneling to the home agent.

It is understood, of course, that FIGS. 2–4 illustrate block diagrams of mobile nodes, home agents, and foreign agents without obfuscating inventive aspects of the present invention with additional elements and/or components which may be required for creating the mobile nodes, home agents, and foreign agents. These additional elements and/or components, which are not shown in FIGS. 2–4, are well known to those skilled in the art.

FIG. 5 illustrates a registration packet 100 according to one embodiment of the present invention. The registration packet may be a registration request packet or a registration reply packet. Preferably, the registration packet includes a type field 102 identifying whether it is a request or a reply packet. The registration packet further includes a code field 104 where preferably each bit of the field is associated with a particular code. Preferably, the code field 104 includes a 'P' bit indicating that the home agent is to maintain the mobile node's care-of address private if the bit is set in a registration request. In this scenario, the home agent may not advertise the care-of address to other nodes that may use it to transmit packets directly to the foreign agent 32 instead of the home agent.

The code field 104 further preferably includes a 'T' bit indicating a request to the home agent to accept a reverse tunnel from the care-of address if the bit is set in a registration request.

The code field 104 also includes code bits used in registration reply packets for indicating that private addresses are not allowed, private addresses are already in use, and that the 'P' bit is unset. The code bit indicating that private addresses are not allowed is preferably set by the home agent in a registration reply packet if the home agent does not support a private address space extension to mobile IP.

The code bit indicating that private addresses are already in use are preferably set by the foreign agent in a registration reply packet denying the registration request upon detection of another valid registration with the same private IP address.

The code bit indicating that the 'P' bit is unset is preferably set by the home agent in a registration reply packet denying the registration request to prevent other nodes from bypassing the home agent and transmitting data packets directly to the foreign agent.

A particular registration packet 100 further includes a lifetime field 106 indicating the time duration for which a mobility binding is valid.

The registration packet 100 also includes a home address field 108 and a home agent field 110. The home address field 108 indicates the IP address of the mobile node. The IP address is preferably a private IP address. The home agent field 110 indicates the IP address of the mobile node's home agent.

A care-of address field 112 indicates the termination point of a tunnel toward a mobile node. Preferably, the care-of address is the IP address of the foreign agent 32.

An identification field 114 preferably indicates a number used for matching registration requests with registration replies and to prevent the mobile from accepting old messages.

An extension field 116 allows additional information to be transmitted along with a registration request or reply packet. Preferably, the extension field 116 is used to transmit a temporary address in the event duplicate private IP addresses.

FIG. 6 is a more detailed illustration of the extension field 116 used for transmitting a temporary address according to one embodiment of the present invention. Preferably, the extension field 116 includes a type field for identifying the extension as a temporary address extension. The extension field 116 further includes a temporary address field 116b for identifying the temporary address to be used by the mobile node requesting the registration.

Figure 7:
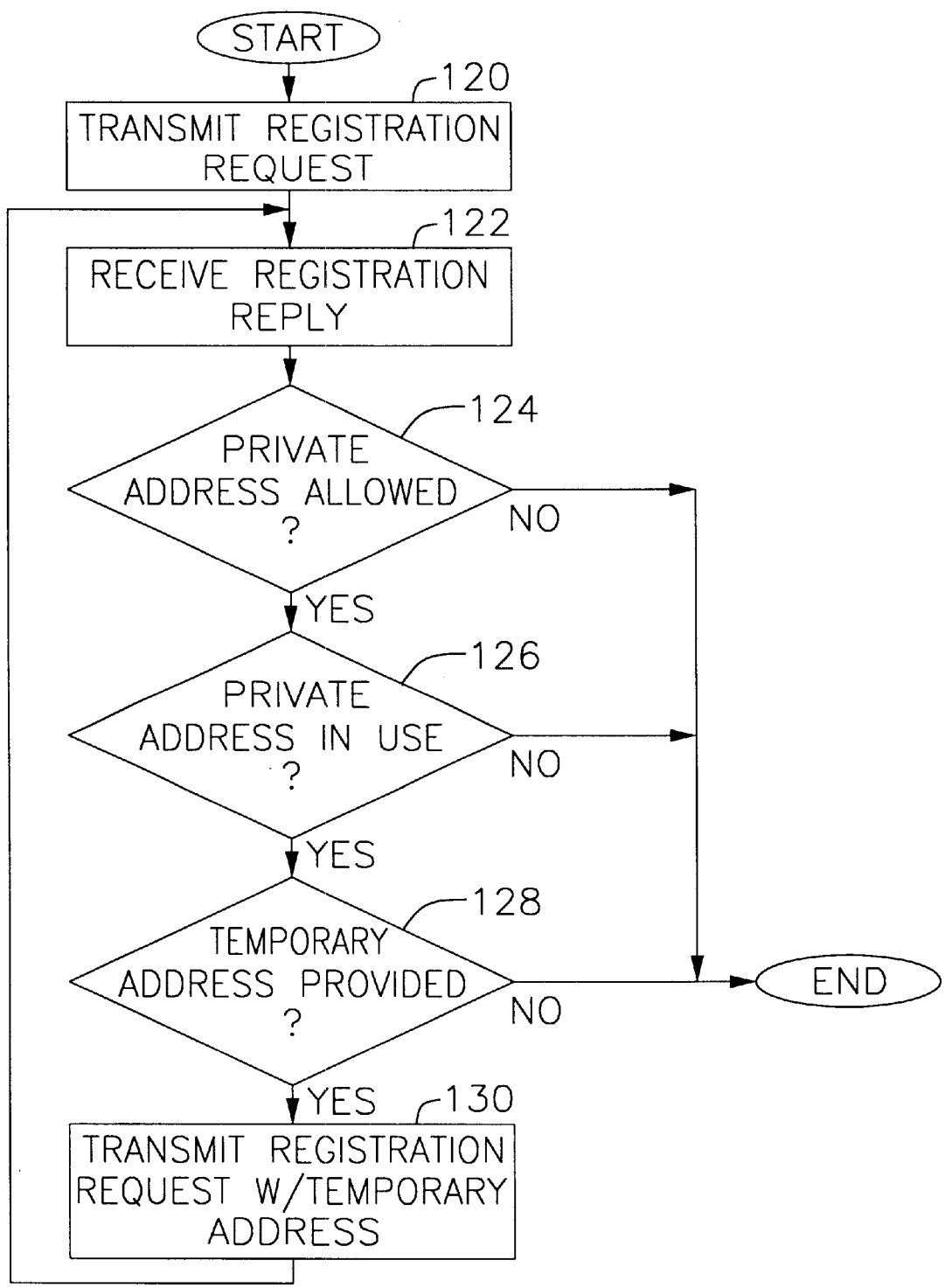
FIG. 7 is a flow diagram illustrating a registration process executed by the mobile node of FIG. 4 according to one embodiment of the invention.

FIG. 7 is a flow diagram illustrating a registration process executed by the mobile node 12, 16 according to one embodiment of the invention. The process starts, and in step 120, the mobile node transmits to the foreign agent 32 a registration request packet including its private IP address via its registration module 74. The mobile node receives a registration reply packet from the foreign agent 32 in step 122. The registration module 74 examines the code field 104 of the registration reply packet to determine, in step 124, whether it indicates that private addresses are not allowed. If private addresses are not allowed, the process ends, and the mobile node does not attempt to register with its home agent via this particular foreign agent 32.

Otherwise, if private addresses are allowed, the registration module 74 further examines the code field 104 of the registration reply packet to determine, in step 126, whether the private IP address used by the mobile node is in use by another mobile node with a valid mobility binding. If the private IP address is not being used, IP routing functions may be provided to the mobile node as set forth in RFC 2002 and 2344 once the registration request is granted.

If the code field indicates that the private IP address is being used by another mobile node, the registration module 74 examines the extension field 116 of the registration reply packet to determine, in step 128, if a temporary address was provided by the foreign agent 32. If it was provided, the registration module transmits in step 130 another registration request with the temporary address, and returns to step 122 to await for a registration reply.

Figure 8:
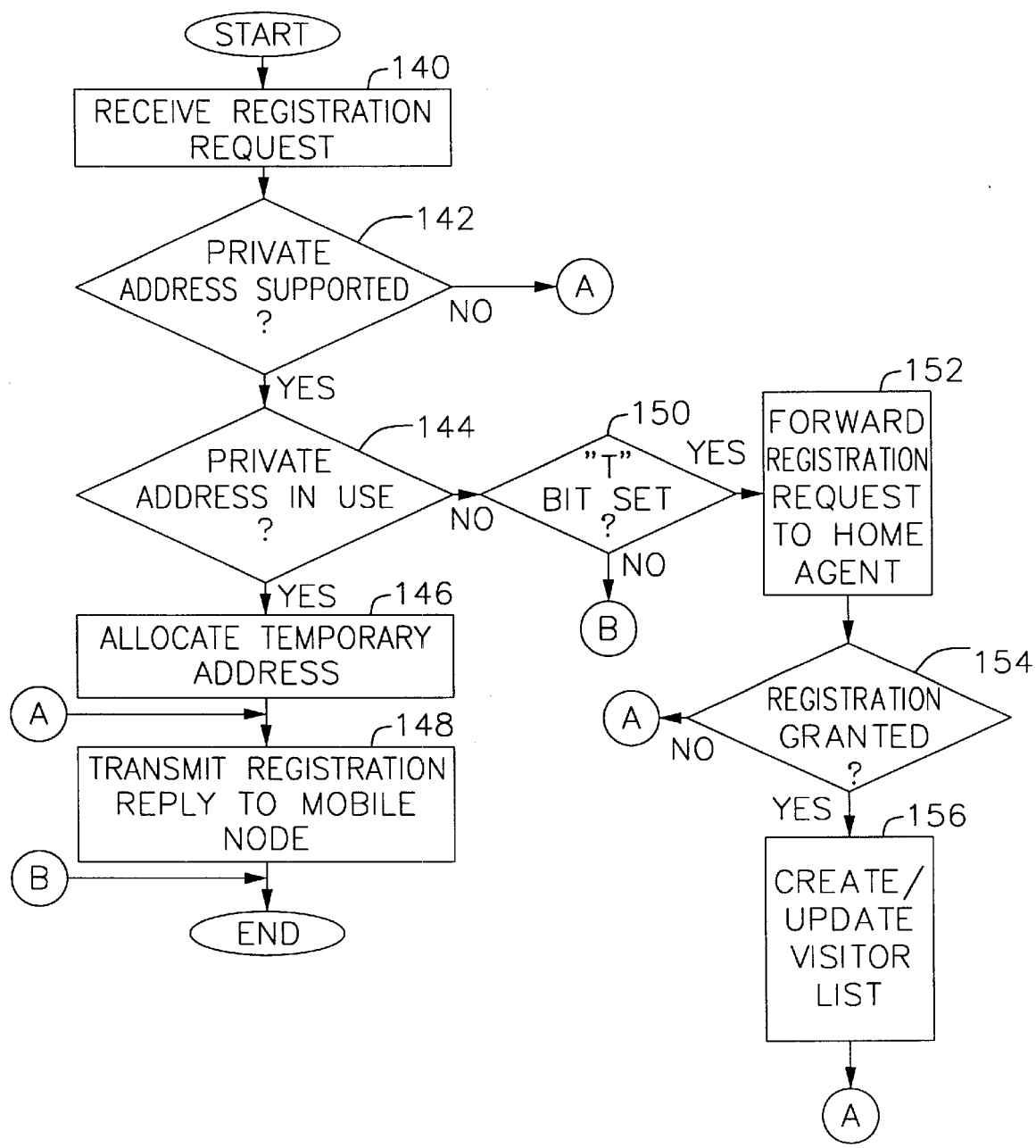
FIG. 8 is a flow diagram illustrating a registration process executed by the foreign agent of FIG. 2 according to one embodiment of the invention.

FIG. 8 is a flow diagram illustrating a registration process executed by the foreign agent 32 according to one embodiment of the invention. The process starts, and in step 140, the foreign agent 32 receives a registration request packet from the mobile node 12, 16. The registration request packet is handed over to the registration engine 42 which examines the home address field 108 to determine, in step 142, if the private address included belongs to the private address space defined in RFC 1918. If the private address is not supported, the registration engine 42 returns a registration reply packet in step 148 denying the registration request.

However, if the private address is supported, the registration engine 42 queries a visitor cache 44 in step 144 to determine if a valid entry for the private address already exists in the cache. If it does, the registration engine 42 proceeds to allocate a temporary address to the registering mobile node in step 146. In step 148, the registration engine 42 transmits a registration reply packet to the mobile node including the temporary address in the extension field 116 of the packet.

Referring again to step 144, if the private address is not already n use by another mobile node, the registration engine 42 inquires if the 'T' bit is set in the code field 104 of the registration request packet, thus indicating a request to have support for reverse tunneling as described in RFC 2344. If the 'T' bit is set, the registration engine 42 retrieves the address of the home agent from the home agent field 110, and forwards the registration request to the address. In step 154, the registration engine 42 inquires if the registration request was granted by the home agent. If it was, the registration engine 42 proceeds to update a visitor list in the visitor cache 44 by creating an entry for the mobile node. The entry preferably includes the mobile node's link-layer source address, home address, temporary address (if assigned), home agent address, lifetime information, and the like. The registration engine 42 further forwards in step 148, a registration reply packet informing the mobile node that the registration has been granted.

Figure 9:
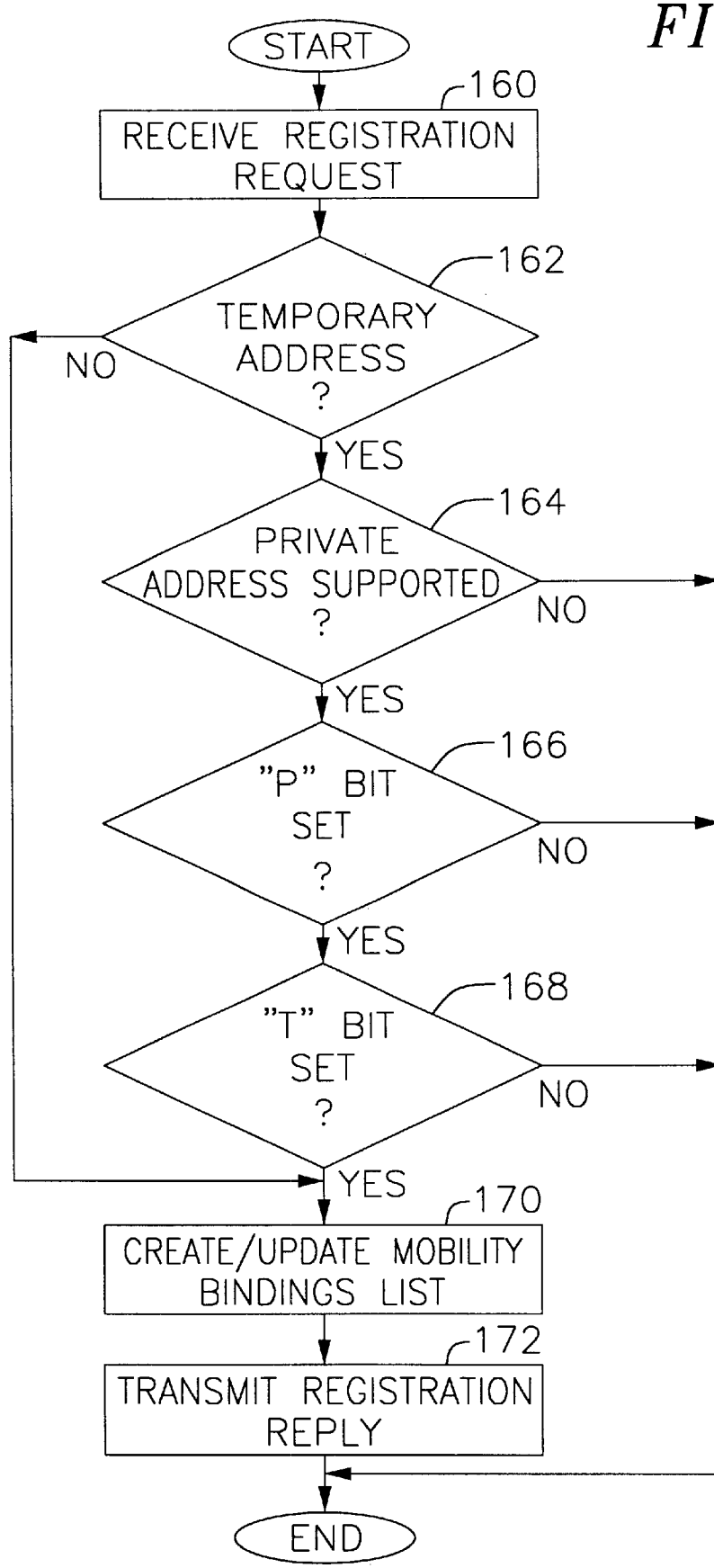
FIG. 9 is a flow diagram illustrating a registration process executed by the home agent of FIG. 3 according to one embodiment of the invention.

FIG. 9 is a flow diagram illustrating a registration process executed by the home agent 28, 30 according to one embodiment of the invention. The process starts, and in step 160, the home agent receives a registration request packet forwarded by the foreign agent 32. The packet is forwarded to the registration engine 62, which preferably examines the extension fields 116 of the packet to determine if it includes a temporary address. If it does not include a temporary address, the registration request packet proceeds to register the mobile node according to the process set forth in RFC 2002.

In step 170, the registration engine 62 creates or updates the mobility bindings list in the mobility bindings cache 64 to include an entry for the registered mobile node. Preferably, the entry associates the mobile node's home address to the foreign agent care-of address along with the remaining lifetime of the association. In step 172, the registration engine 62 transmits a registration reply granting the registration.

Referring again to step 162, if a temporary address was included in the registration request packet, the registration engine 62 inquiries, in step 164, whether private address extensions are supported by the home agent. If the answer is YES, the registration engine further inquires in step 166 whether the 'P' bit is set in the code field 104 of the registration request packet, indicating that the care-of address is not to be advertised. In step 168, the registration engine further inquires if the 'T' bit is set in the code field 104, indicating a request to have support for reverse tunneling as described in RFC 2344. If the answer is again YES, the registration request is granted. Thus, in step 170, the registration engine 62 proceeds to create or update the mobility bindings list to include an entry for the registering mobile node. Preferably, the entry associates the mobile node's home address to the temporary address and foreign agent care-of address, along with the remaining lifetime of the association. In step 172, the registration engine transmits a registration reply 172 indicating that the registration has been granted.

Figure 10A:
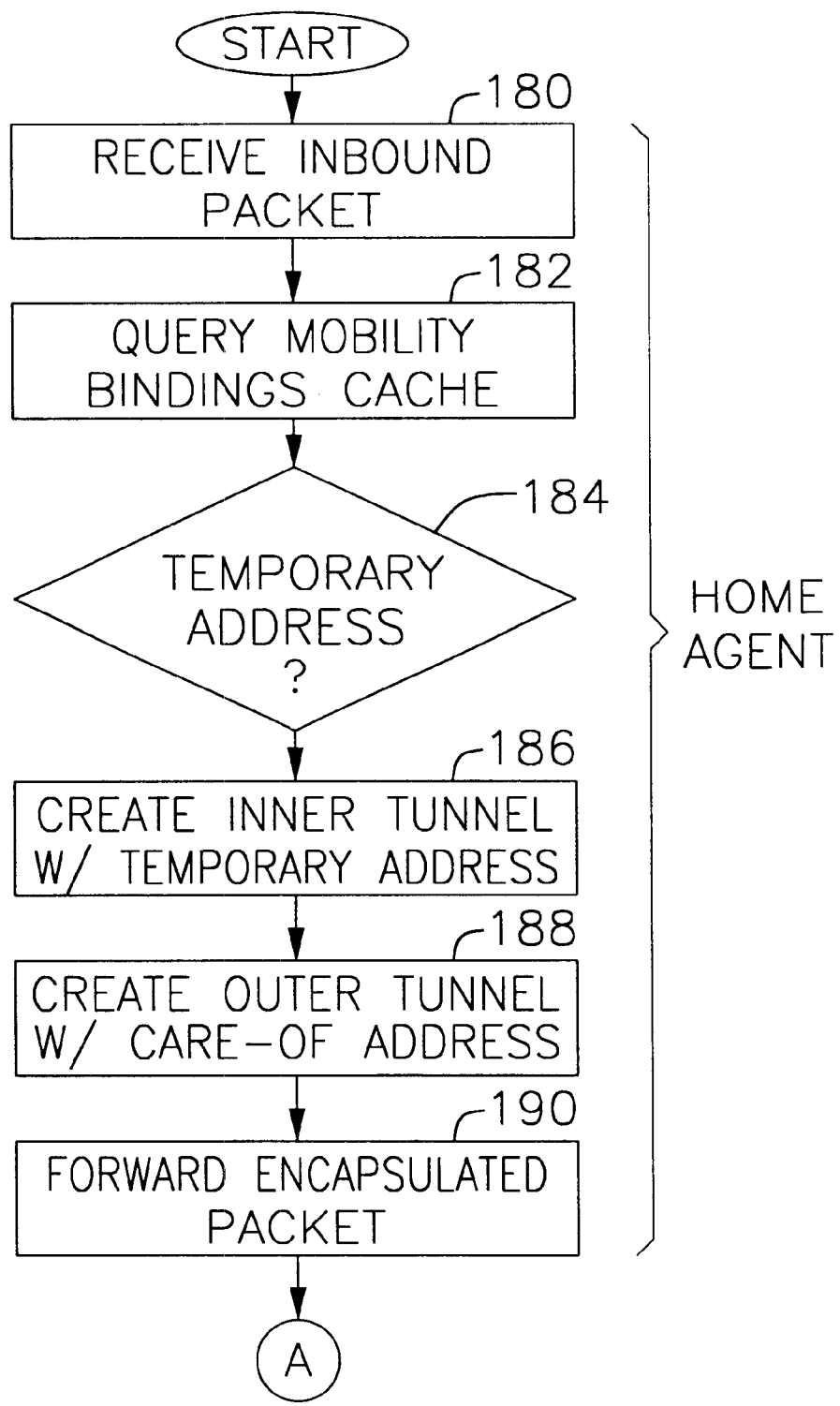
FIGS. 10A–10C are flow diagrams illustrating the reception of an inbound packet addressed to the mobile node of FIG. 4 according to one embodiment of the invention.
Figure 10B:
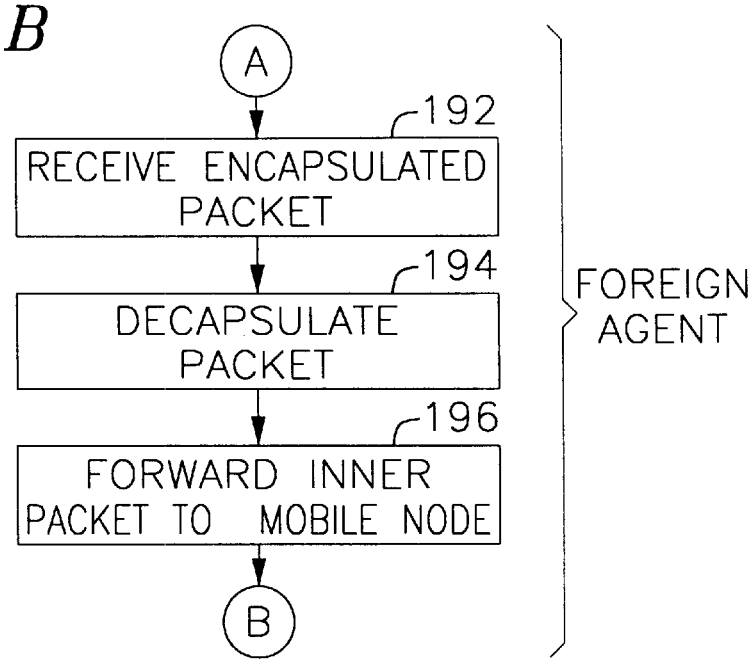
Figure 10C:
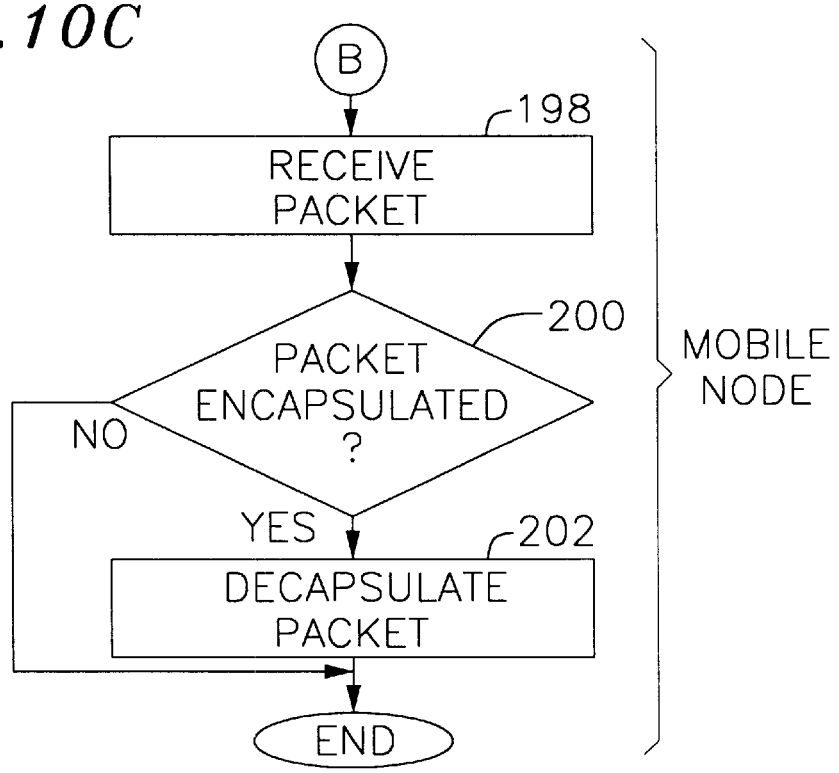

FIGS. 10A–10C are flow diagrams illustrating the reception of an inbound packet addressed to the mobile node 12 or 16 according to one embodiment of the invention. In step 180, the home agent receives an inbound packet addressed to its mobile node. In step 182, the home agent queries the mobility bindings cache to retrieve the mobility bindings for its mobile node. In step 184, the home agent inquires if a temporary address is associated with its mobile node. If the answer is YES, the home agent invokes the encapsulation/decapsulation engine 66 in step 186 to create a first tunnel having the temporary address as an endpoint. Accordingly, the encapsulation/decapsulation engine 66 encapsulates the inbound packet into a new packet having the temporary address as a destination address. Preferably, the encapsulation method utilized is IP-in-IP, as is described in "IP Encapsulation within IP," C. Perkins, RFC 2003, October 1996, or as described in "Minimal Encapsulation Within IP," C. Perkins, RFC 2004, October 1996, the contents of both of which are incorporated herein by reference.

In step 188, the encapsulation/decapsulation engine 66 creates a second tunnel having the foreign agent care-of address as a destination address. Accordingly, the encapsulation/decapsulation engine 66 takes the encapsulated inbound packet and encapsulates it into another packet having the foreign agent care-of address as a destination address. In step 190 the packet is forwarded via the two tunnels.

Referring again to step 184, if the mobile node is not associated with a temporary address, a single tunnel is created using the care-of address according to the process set forth in RFC 2002, and the packet is forwarded via the single tunnel.

The foreign agent 32 receives the encapsulated packet in step 192. In step 194, the foreign agent decapsulates the packet and forwards the inner packet to the mobile node in step 196. In the case of duplicate private IP addresses, the inner packet is another encapsulated packet which allows it to be tunneled to the correct mobile node.

In step 198, the mobile node receives the packet forwarded by the foreign agent 32, and determines in step 200 whether the packet is encapsulated. If it is, the mobile node decapsulates it to retrieve the original packet addressed to it.

Figure 11A:
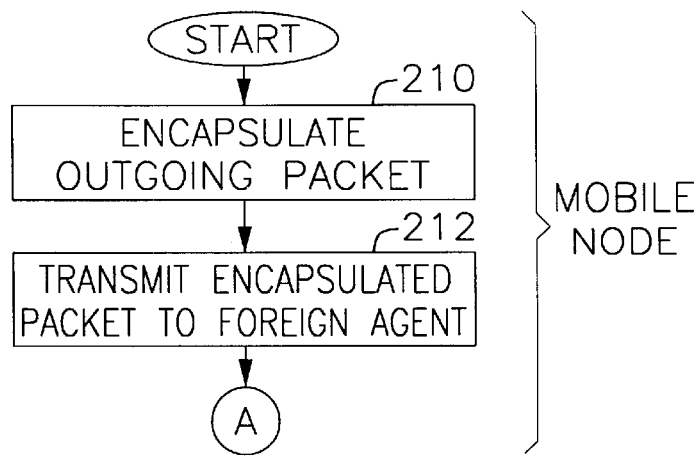
Figure 11B:
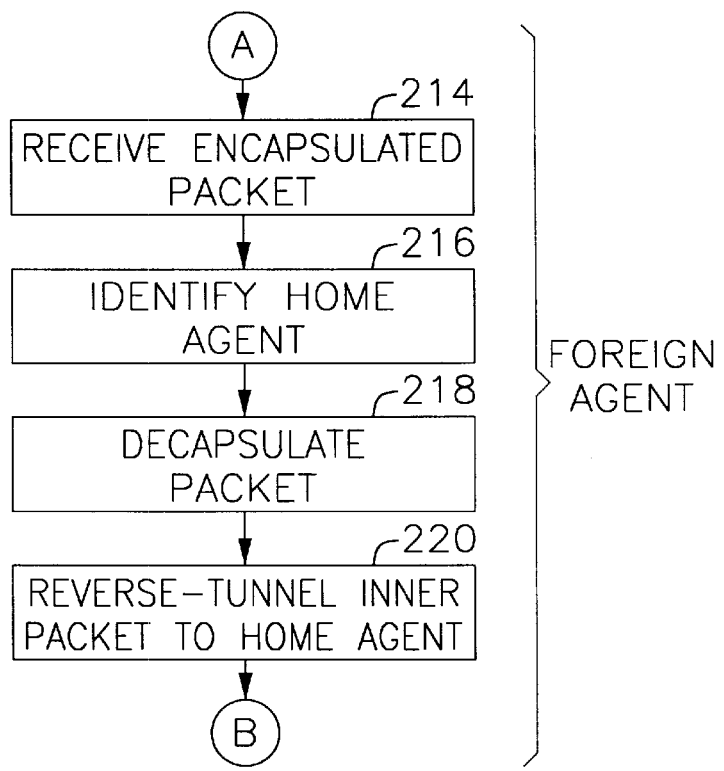

FIGS. 11A–11C are flow diagrams illustrating the transmission of an outgoing packet by mobile node 16 upon being assigned a temporary address according to one embodiment of the invention. In step 210, the mobile node encapsulates the outgoing packet into another packet having the temporary address as its source address and the foreign agent care-of address as the destination address. The encapsulated packet is then transmitted to the foreign agent in step 212.

The foreign agent receives the encapsulated packet in step 214, and in step 216, identifies the appropriate home agent to which to forward the outgoing inner packet. In this regard, the foreign agent examines the source address field of the outer packet and retrieves the temporary address from the source address field. The temporary address is then preferably used to query the visitor cache 44 for the appropriate home agent address.

In step 218, the foreign agent decapsulates the packet to retrieve the outgoing inner packet. In step 220, the foreign agent reverse tunnels the outgoing inner packet to the appropriate home agent using the retrieved home agent address.

In step 222, the home agent receives the encapsulated packet via the reverse tunnel. In step 224, the home agent decapsulates the packet to retrieve the outgoing inner packet. In step 228, the home agent forwards the outgoing inner packet to its ultimate destination address on behalf of the mobile node.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A data communication network comprising:
a first forwarding node associated with a first site;
a second forwarding node associated with a second site;
a first mobile node with a first address visiting the second site from the first site, characterized in that the second forwarding node determines whether a second mobile node visiting the second site has the same first address as the first mobile node, selects a second address for the first mobile node if the second mobile node has the same first address, and transmits the second address to the first forwarding node for use to forward packets addressed to the first mobile node.

2. The data communication network of claim 1, wherein the first address is a private address.

3. The data communication network of claim 1, further characterized in that the first mobile node transmits a first registration request including the first address, receives a registration reply including the second address, and transmits a second registration request including the second address.

4. The data communication network of claim 1, further characterized in that the first forwarding node receives the second address, associates the second address to the first mobile node, and stores the association information in a memory.

5. The data communication network of claim 1, further characterized in that the first forwarding node receives a first packet addressed to the first mobile node, encapsulates the first packet into a second packet having the second address as a destination address, further encapsulates the second packet into a third packet, and transmits the third packet to the second forwarding node.

6. The data communication network of claim 5, further characterized in that the second forwarding node receives the third packet, decapsulates the third packet to retrieve the second packet, and forwards the second packet to the first mobile node.

7. The data communication network of claim 6, further characterized in that the first mobile node receives the second packet and decapsulates the second packet to retrieve the first packet.

8. The data communication network of claim 6, further characterized in that the first mobile node encapsulates a first packet into a second packet having the second address as a source address and transmits the second packet to the second forwarding node.

9. The data communication network of claim 8, further characterized in that the second forwarding node receives the second packet, associates the second address with the first forwarding node, retrieves the first packet from the second packet, and transmits the first packet to the first forwarding node.

10. In a data communication network including a first forwarding node associated with a first site, a second forwarding node associated with a second site, and a first mobile node having a first address visiting the second site from the first site, the second forwarding node comprising:

an input for receiving inbound packets;

an output for forwarding outbound packets;

a memory for storing a second address of a second mobile node visiting the second site; and a registration engine coupled to the input, output, and memory, characterized in that the registration engine receives via the input a registration request packet including the first address, searches the memory for determining whether the first address is the same as the second address, selects a third address for the first mobile node if the first address is the same as the second address, and transmits the third address via the output.

11. The second forwarding node of claim 10, further characterized in that the registration engine transmits the third address to the first forwarding node.

12. The second forwarding node of claim 10, further characterized in that the registration engine transmits the third address to the first mobile node.

13. The second forwarding node of claim 10, wherein the first address is a private address.

14. The second forwarding node of claim 10 further comprising a decapsulation engine coupled to the input and the output, characterized in that the input receives a first packet encapsulating a second packet, the second packet having the third address as a destination address, and the decapsulation engine decapsulates the first packet to retrieve the second packet and transmits the second packet to the first mobile node.

15. The second forwarding node of claim 14, wherein the input receives a first packet encapsulating a second packet, the first packet having the second address as a source address, and the decapsulation engine decapsulates the first packet to retrieve the second packet, associates the second address with the first forwarding node, and transmits the second packet to the first forwarding node.

16. In a data communication network including a first forwarding node associated with a first site, a second forwarding node associated with a second site, and a mobile node visiting the second site from the first site, the first forwarding node comprising:

an input for receiving an inbound packets;

an output for forwarding an outbound packets;

a memory for associating the mobile node to a particular address;

an encapsulation engine coupled to the input, output, and memory, characterized in that a first packet addressed to the mobile node is received by the input and encapsulated by the encapsulation engine into a second packet having the particular address as a destination address, the second packet being further encapsulated into a third packet and transmitted to the second forwarding node via the output.

17. The first forwarding node of claim 16 further comprising a registration engine receiving a registration request packet including the particular address.

18. In a data communication network including a first forwarding node associated with a first site, a second forwarding node associated with a second site, and a mobile node with a first address visiting the second site from the first site, the mobile node comprising:

an input for receiving inbound packets;

an output for transmitting outbound packets; and a registration engine coupled to the input and the output, characterized in that the registration engine transmits via the output a first registration request packet including the first address, receives via the input a registration reply packet including a second address, and transmits via the output a second registration request packet including the second address.

19. The mobile node of claim 18, wherein the first address is a private address.

20. The mobile node of claim 18 further comprising a decapsulation engine coupled to the input and the output, characterized in that the input receives a first packet having the second address as a destination address, the first packet encapsulating a second packet, and the decapsulation engine decapsulates the first packet for retrieving the second packet.

21. The mobile node of claim 18 further comprising an encapsulation engine coupled to the output, characterized that the encapsulation engine encapsulates a first packet into a second packet having the second address as a source address and transmits the second packet to the second forwarding node via the output.

22. In a data communication network including a first forwarding node associated with a first site, a second forwarding node associated with a second site, and a first mobile node with a first address visiting the second site from the first site, a method for providing routing support for the first mobile node, the method comprising:

determining whether a second mobile node visiting the second site has the same first address as the first mobile node;

selecting a second address for the first mobile node if the second mobile node has the same first address; and transmitting the second address to the first forwarding node for using to forward packets addressed to the first mobile node.

23. The method of claim 22, wherein the first address is a private address.

24. The method of claim 22 further comprising:

receiving a first registration request from the first mobile node;

transmitting a registration reply including the second address in response to the first registration request; and receiving a second registration request including the second address.

25. The method of claim 22 further comprising:

receiving a first packet encapsulating a second packet, the second packet having the second address as a destination address, the second packet further encapsulating a third packet;

decapsulating the first packet to retrieve the second packet; and forwarding the second packet to the first mobile node.

26. The method of claim 25 further comprising:

receiving the second packet; and decapsulating the second packet to retrieve the third packet.

27. The method of claim 22 further comprising:

encapsulating a first packet into a second packet having the second address as a source address; and transmitting the second packet to the second forwarding node.

28. The method of claim 27 further comprising:

receiving the second packet;

associating the second address with the first forwarding node;

retrieving the first packet from the second packet; and transmitting the first packet to the first forwarding node.

29. In a data communication network including a first forwarding node associated with a first site, a second forwarding node associated with a second site, and a mobile node visiting the second site from the first site, a method for providing routing support for the first mobile node, the method comprising:

receiving a registration request transmitted by the mobile node, the registration request including a particular address;

associating the mobile node to the particular address;

receiving a first packet addressed to the mobile node;

encapsulating the first packet into a second packet, the second packet having the particular address as a destination address;

encapsulating the second packet into a third packet; and transmitting the third packet to the second forwarding node.

* * * * *